(12) United States Patent
Ganapathy (10) Patent No.: US 7,178,023 B1
(45) Date of Patent: *Feb. 13, 2007

(54) SYSTEM AND METHOD TO FACILITATE SECURE COMMUNICATION OF DATA

(75) Inventor: Narayanan Ganapathy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1053 days.

This patent is subject to a terminal disclaimer.

(21) Appl. No.: 09/771,734

(22) Filed: Jan. 29, 2001

(51) Int. Cl.
*H04L 9/00* (2006.01)

(52) U.S. Cl. .................... 713/167; 726/4; 709/212; 719/314

(58) Field of Classification Search ............. 713/170, 713/201
See application file for complete search history.

(56) References Cited

U.S. PATENT DOCUMENTS

| | | | |
|---|---|---|---|
| 5,808,911 A * | 9/1998 | Tucker et al. | 719/316 |
| 6,604,123 B1 * | 8/2003 | Bruno et al. | 718/100 |
| 6,766,467 B1 * | 7/2004 | Neal et al. | 714/5 |

OTHER PUBLICATIONS

Ateniese, G., et al.; "New Multiparty Authentication Services and Key Agreement Protocols", *IEEE Journal on Selected Areas in Communications*, vol. 18, No. 4, Apr. 2000, p. 628-638.
R.M. Needham, "The Hardware Environment", *Proceedings of the 1999 IEEE Symposium on Security and Privacy*, 1999, p. 236.

* cited by examiner

*Primary Examiner*—Nasser Moazzami
*Assistant Examiner*—Brandon Hoffman
(74) *Attorney, Agent, or Firm*—Amin, Turocy, & Calvin, LLP (57) ABSTRACT

A system and method facilitate substantially secure communication of messages in an architecture that allows a user-level application or process direct access to hardware, such as may include a storage device. A process directly provides to a storage device a message having address information and validation data associated with its destination. Prior to sending the message from the storage device, the stored message is validated based on its validation data and other validation information that has been associated with the storage device. The validation information is not available to the user-level process sending the message. The message may be sent from the storage device provided that its validation data is proper.

34 Claims, 7 Drawing Sheets

SYSTEM AND METHOD TO FACILITATE SECURE COMMUNICATION OF DATA

TECHNICAL FIELD

The present invention relates to data communication and, more particularly, it relates to a system and method to facilitate substantially secure communication of data.

BACKGROUND

Various data communication infrastructures have been developed that enable a process or method to have requests processed by input/output (IO) devices. In such an architecture, for example, a client submits a request to a process operating in user-mode. The user-mode process submits a file retrieve command to a kernel-mode file server process. After receiving the file retrieve command, the kernel-mode file server process copies the file identified in the file retrieve command to a buffer in non-cache user addressable RAM. Thereafter, the kernel-mode file server process informs the user-mode process of the completed file copy to the buffer. The user-mode process makes a separate system call to a transport protocol invoking a data transmit procedure for transmitting the buffered file to an identified destination, such as an input/output device. The buffered file is then transmitted via the transport protocol.

At no time in such an infrastructure does the user-mode application or process that issued the request have direct access to hardware destinations. Instead, the operating system, operating in kernel mode, acts as an intermediary issuing the requests to the hardware via a corresponding communications protocol. As a result, IO requests and other interprocess communication usually involve a lengthy kernel code path to reach their intended destination, which imposes an undesirable delay.

Consequently, existing infrastructures have failed to adequately keep pace with computer evolution and the increased burden imposed on data servers, application processing, and enterprise computing created by the popular success of the Internet. In particular, high-end computing concepts such as clustering, fail-safe, and 24×7 availability demand greater capacity to move data between processing nodes as well as between a processor node and IO devices. These trends require higher bandwidth and lower latencies, as they tend to push more functionality down to the IO device and demand greater protection, higher isolation, deterministic behavior, and a higher quality of service than conventionally available.

As a result, new architectures are being developed in which a user-level application or process may directly access hardware, such as to issue IO requests. However, by permitting an application or process direct access to hardware, a security issue arises that (if not properly addressed) could compromise access to hardware. Therefore, it is desirable to provide a system and method to facilitate substantially secure communication of data.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an infrastructure that is configured to permit a user-level application or process to directly access hardware, the present invention provides a system and method to facilitate secure communication of messages, such as input/output requests, from the application or process. Each message includes a key, which has a value, for enabling communication between hardware components, such as queues. For example, a receive queue can only receive an incoming message from a send queue if the message has a valid key value.

In accordance with an aspect of the present invention, an interface component associated with an originating hardware communications component is configured to examine and validate the key in an outgoing message. An attribute may be associated with the originating communications component, which has a condition that is operable to control validation of outgoing messages by the interface component.

By way of example, if the attribute has a first condition, the interface component is operable to send a message from the originating communications component provided that the message has a key within a selected range of one or more key values. If the attribute has a second condition, the interface component is operable to send a message from the originating communications component the message has a key within another range of one or more key values, which is different from the selected range. The selected range of key values may be preset for the originating communications component, such as through a privileged operation not accessible by a user-level application or process.

Another aspect of the present invention provides a system to facilitate substantially secure communication between at least two processes. The system includes a hardware communication component operative to store an outgoing message received directly from an associated process. The outgoing message includes a message key having a key value. An attribute is associated with the communication component, the attribute having a selectable condition that is inaccessible by the associated process. A filter, which is associated with the communication component, controls sending the stored outgoing message from the communication component based on the key value of the outgoing message and the attribute condition.

Yet another aspect of the present invention provides a system to facilitate substantially secure communication between at least two processes. The system includes a first queue operative to store a request received directly from a first of the at least two processes and, upon validation of the stored request, to send the stored request to a second of the at least two processes. The stored request includes a key having a key value associated with the second process. An interface is operative to validate the stored request based on the key value of the stored request relative to at least one predetermined key value associated with the first queue. The at least one key value is inaccessible by the first process.

Still another aspect of the present invention provides a method to facilitate substantially secure communication between at least two processes, such as in a system in which a user-level process is operable to communicate directly with hardware. The method includes storing an outgoing message received directly from one of the at least two processes in an associated storage device. The outgoing message includes a message key having a key value. Sending of the stored message to another of the at least two processes is controlled based on the value of the message key relative to a predetermined at least one key value associated with the storage device. The at least one key value associated with the storage device is unavailable to the first process. In accordance with one particular aspect, at least part of the method may be implemented as computer-executable instructions in a computer readable medium.

Another aspect of the present invention provides a method to facilitate substantially secure communication between at least two processes, such as in a system in which a user-level process is operable to communicate directly with hardware. The method includes storing an outgoing message received directly from a first of the at least two user-level processes in a storage device associated with the first process. The outgoing message includes a message key associated with a destination. An attribute is associated with the storage device, the attribute having a selectable condition unavailable to user-level processes. Sending of the stored outgoing message from the storage device is controlled based on the message key thereof and the attribute condition. In accordance with one particular aspect, at least part of the method may be implemented as computer-executable instructions in a computer readable medium.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

The present invention provides a system and method to facilitate substantially secure communication of messages in an architecture that allows user-level applications or processes direct access to hardware, such as may include a storage device. A user-level process provides a message to a storage device having data and a validation code associated with its destination. Prior to sending the message to its desired destination, the message is validated based on its validation code and validation information that has been associated with the storage device. The validation information is not available to the process sending the message.

Figure 1:
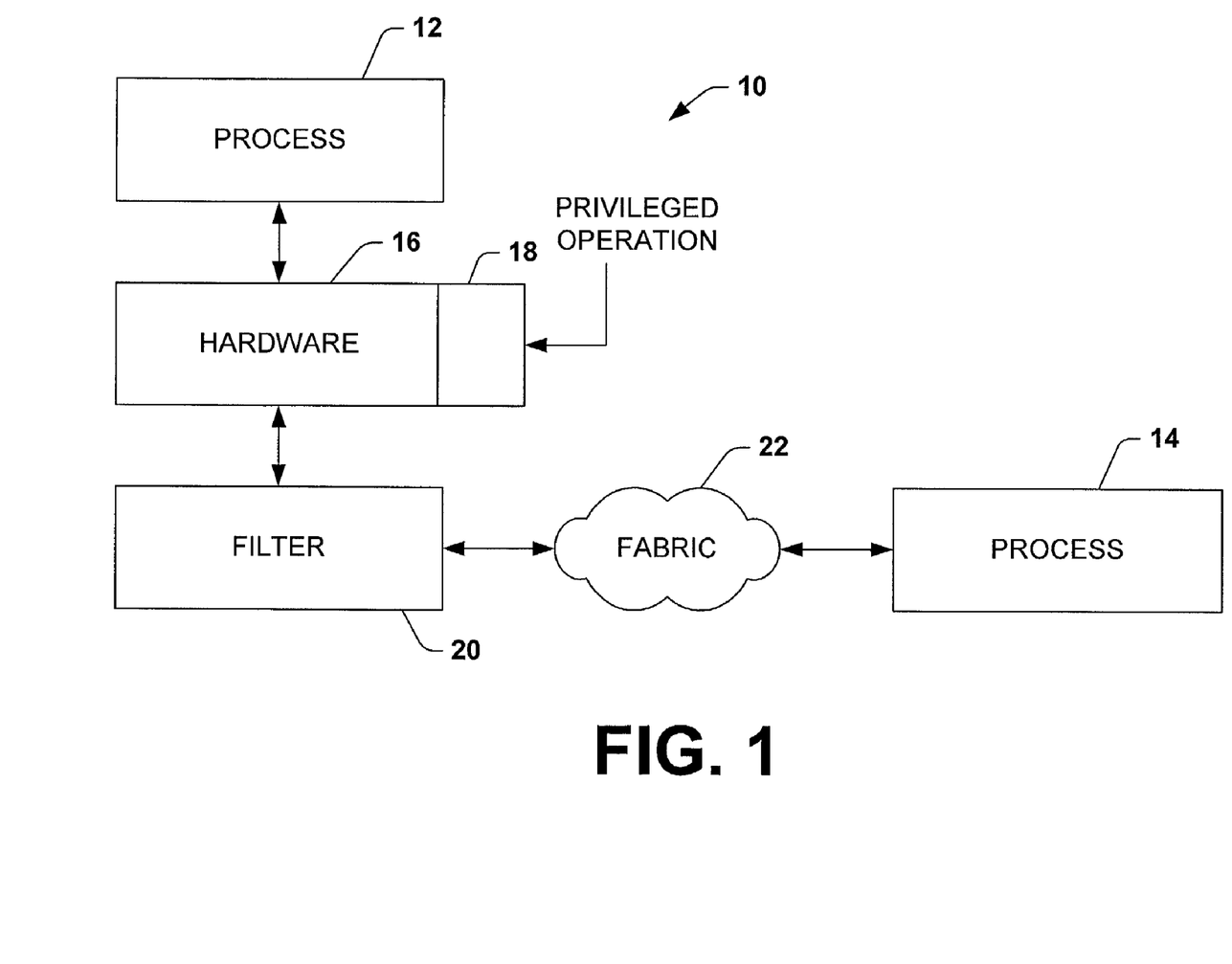
FIG. 1 is a simplified example of a system in accordance with the present invention.

Turning to FIG. 1, a system 10 programmed and/or configured to facilitate substantially secure communication of information from a first process 12 to a remote process 14 is illustrated. The remote process 14 may be associated with a different node from the node where the process 12 is resident or it may be local (e.g. at the same node) relative to the process 12.

As illustrated in the example of FIG. 1, the process 12 is coupled to a hardware component 16. Validation information, indicated at 18, is associated with the hardware component 16. The validation information 18 determines whether a message from the process 12 may be sent by the hardware component 16, such as to the other process 14. The validation information 18 is set, for example, through a privileged operation (e.g., by an operating system associated with the process 12), which is not accessible by the process 12 itself. The validation information 18 thus defines a privileged characteristic that may be utilized to control communication of messages from the process 12.

The system 10 also includes a filter component 20 programmed and/or configured to control sending messages from the hardware component 16. For example, the filter component 20 may control whether a message is sent from the hardware component 16 to an associated communications fabric 22. In particular, the filter component 20 examines the validation information 18 relative to selected data in the message from the process 12, such as may be provided to the process 12 by the other process 14. The filter component 20 validates the selected data based on the validation information 18 and, in turn, controls whether the message may be sent.

By way of example, the validation information 18 may define one or more valid values of key data. If the selected data in a message is valid, the filter component 20 may permit the message to be sent from the hardware component 16. Similarly, if the selected data in a message has an invalid value, the filter component 20 may prevent the message from being sent from the hardware component. As a result, a valid message from the process may be sent from the first process to the second process 14, while a message having an invalid key may be disposed of and not sent. Those skilled in the art will understand and appreciate alternative validation and filtering schemes in accordance with the present invention that could be utilized in connection with the hardware component 16 to control sending messages with unauthorized or arbitrary key data.

Figure 2:
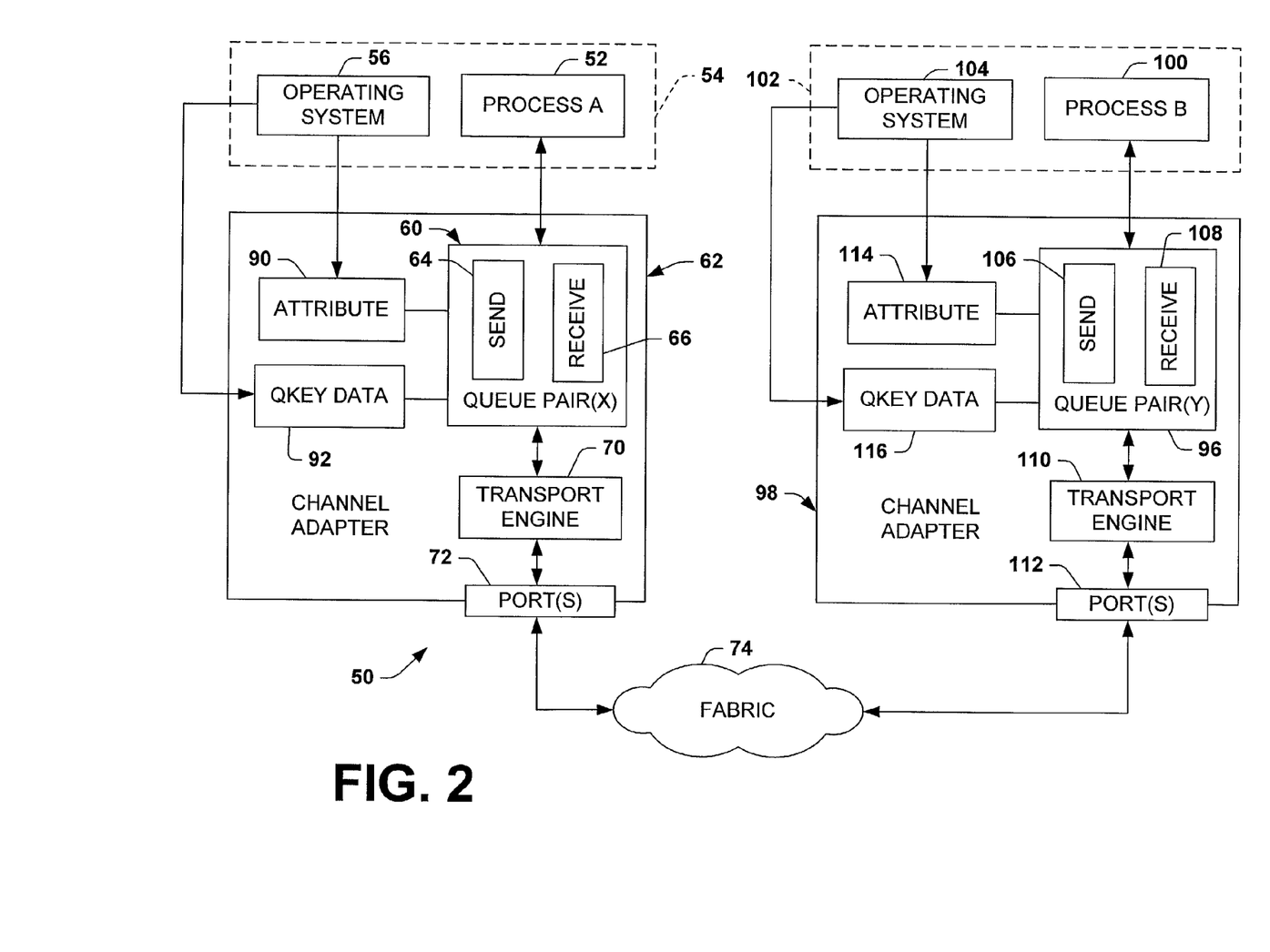
FIG. 2 is functional block diagram illustrating a system in accordance with the present invention.

FIG. 2 illustrates an example of a system architecture 50 implementing a system, in accordance with an aspect of the present invention, which provides for substantially secure communication. An application or process (PROCESS A) 52 runs within memory of a computer, schematically indicated at 54, such as associated with a host processor node. While a single process 52 is illustrated as running within the computer 54, those skilled in the art will understand and appreciate that more than one process could be implemented within the computer memory and/or more than one computer may be associated with a given processor node. An operating system 56 also runs within the computer 54, which is operable to control privileged operations for the process 52.

The process 52 is operative to directly communicate a message, such as an IO request or other type of interprocess communication, with a queue pair 60 located within a hardware device, such as a channel adapter 62. A queue pair is a hardware abstraction created to facilitate communication between applications and/or processes. The queue pair 60 includes a pair of queues, illustrated as a send queue 64 and a receive queue 66. The queue pair 60 has a queue pair value (e.g., a number) that uniquely characterizes each queue pair within the channel adapter 62. In this example, the queue pair 60 has a queue pair number represented by an "X".

By way of example, the associated operating system 56 maps the respective queues 64 and 66 into a virtual address space associated with the process 52. The process 52 thus is able to communicate directly with each queue 64 and 66 of the queue pair 60, such as to send an IO request to an IO module or a message to another process, as well as to receive messages from other processes.

While, for purposes of brevity, the channel adapter 62 is illustrated as having a single queue pair 60, it is to be understood and appreciated that any number of queue pairs may exist in a channel adapter at any given time. Moreover, different types of queue pairs may be implemented depending upon a desired type of communication scheme being implemented, such as may provide different levels of reliability and accuracy. In addition, each queue pair may be associated with a different application or process, although each application may be associated with one or more queue pairs. While the channel adapter 62 is shown and described as including a hardware component (e.g., the send queue 64) for storing outgoing messages, it is to be understood that other types of hardware, software, or combinations of hardware and software could be utilized to store such data. For example, data could be stored in a stack, a buffer (FIFO or LIFO) or as one or more other data structures in appropriate data storage devices, such as volatile or non-volatile storage devices.

The queue pair 60 is operatively coupled to a transport engine 70, which is operative to control the flow of message data between the queue pair 60 and one or more ports 72 of the channel adapter 62. For example, each port 72 may have its own set of communication buffers, such that each port is capable of sending and receiving data concurrently via an associated communications fabric 74. The transport engine 70 further may control translation between virtual addresses and physical memory addresses. The transport engine 70 also may validate access rights for sending messages from the send queue 64 in accordance with an aspect of the present invention. The transport engine 70 may be configured to validate other access rights as well, such as to enable incoming messages to be received at the receive queue 66.

As mentioned above, a message may be an IO request or other type of message from a process, such as an outgoing message from the process 52 or an incoming message from another process. The message may be sent in one or more data packets, each packet having certain addressing data and key information for routing and validating the message through the system 50.

Figure 3:
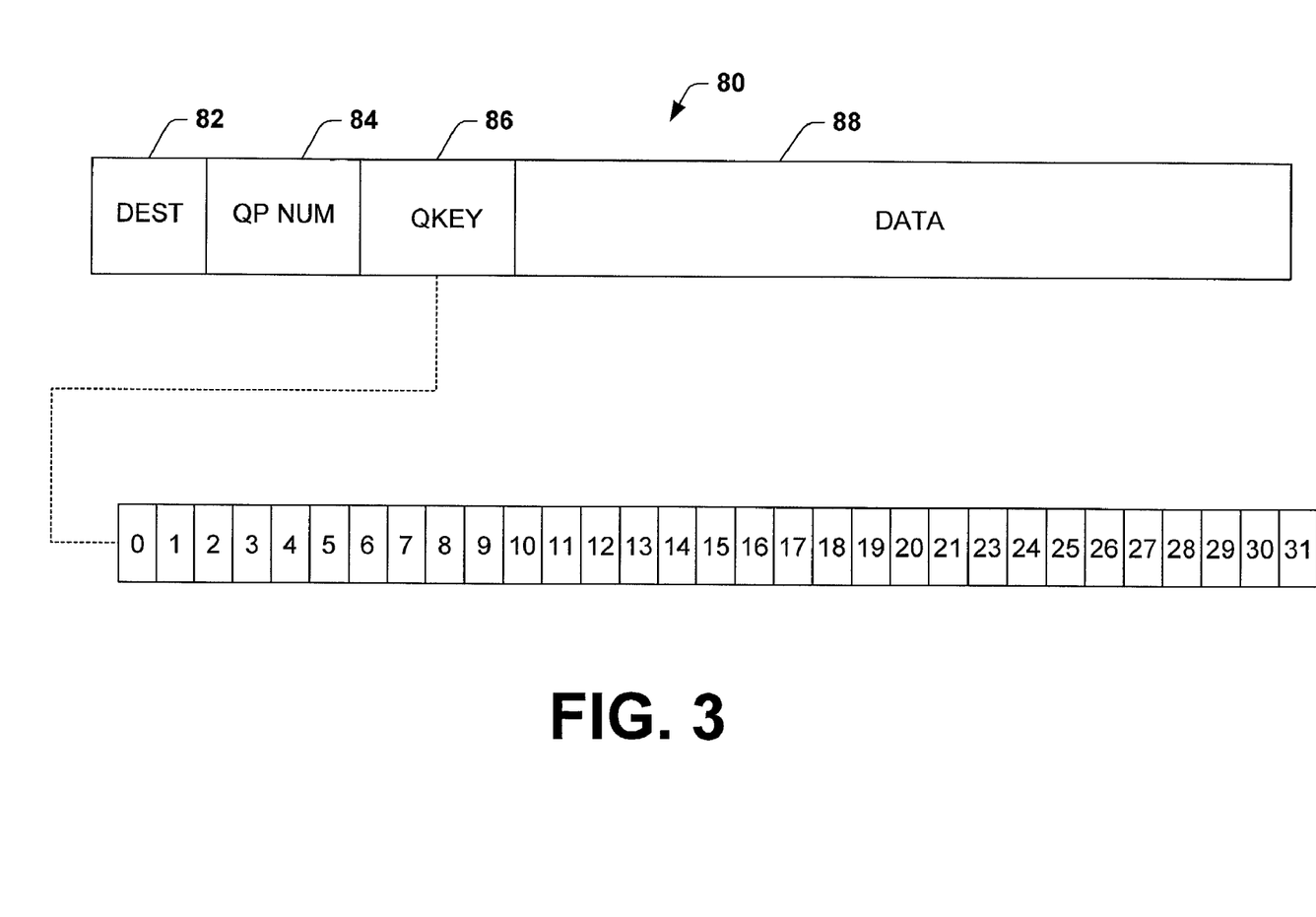
FIG. 3 is an example of a message that may be communicated in a system in accordance with the present invention.

By way of illustration, FIG. 3 depicts a message 80 that may be sent by a process (e.g., the process 52 of FIG. 2). The message 80 includes destination information, which may identify a port and/or channel adapter for which the message is intended. Each channel adapter, for example, may include a globally unique identifier (GUID), such as may be assigned by the channel adapter vendor. Each port of a channel adapter also may have a port GUID. A port address may be defined as a combination of a global ID, such as may be in the format of an IPv6 address, and a local ID. The local ID may be assigned by a local subnet manager, which implements an address resolution process. Those skilled in the art will understand and appreciate various address resolution algorithms that may be utilized to obtain appropriate address information to establish communication service.

The message 80 also includes a queue pair number 84 that uniquely identifies a queue pair within a given channel adapter. A global address for a queue pair thus may be defined as the queue pair number and corresponding destination information. An example of a suitable addressing scheme that may be utilized in accordance with an aspect of the present invention is described in InfiniBand™ Architecture Specification, Vol. 1–3, Release 1.0, which is available on the Internet at http://www.infinibandta.org as published by the InfiniBand™ Trade Association and which is incorporated herein by reference.

The message 80 also includes a Qkey. The Qkey 86 is a construct employed to validate access rights to a destination receive queue, such as indicated by the destination data 82 and queue pair number 84. The Qkey 86 has a value, which is provided by the application or process sending message data 88. For example, the Qkey 86 is multi-bit value, such as a thirty-two bit value (as illustrated), although other sizes of Qkey value also could be utilized in accordance with an aspect of the present invention. If a message does not include a Qkey having a value that matches a corresponding key value stored in a recipient queue pair, the message 80 may be dropped as being invalid, such as by the associated transport engine at the destination channel adapter. However, it is possible that (regardless of its size) a Qkey associated with a queue pair could be guessed by a user-level process, which presents an undesirable security risk.

Referring back to FIG. 2, an attribute 90 is associated with the queue pair 60 to improve the security at the sender's channel adapter 62 in accordance with an aspect of the present invention. The attribute 90 has a condition that is set in a privileged operation not accessible by the process 52, such as by the operating system 56 associated with the process 52. The attribute 90 may have one of two or more conditions (or values), such as corresponding to a single bit or a multi-bit field. The transport engine 70 may, in turn, employ a detected condition of the attribute 90 to control sending each message from the send queue 64. For example, the transport engine 70 may determine whether or not to send a given message based on selected data contained in the message (e.g., the Qkey 86) and the attribute condition. If the message is not validated, the message may be dropped and removed from the queue pair 60.

In accordance with another aspect of the present invention, other control information also may be associated with the queue pair 60 to improve the security associated with sending a message. Such control information may include Qkey data 92 indicative of one or more Qkey values (e.g., a range of Qkey values). The value(s) of the Qkey data 92 is set in a privileged operation not accessible by the process 52, such as by the operating system 56. The transport engine 70 may control sending each message from the send queue 64 to a designated destination based on the Qkey data 92 and the Qkey contained in a message that has been provided to the send queue 64. For example, the transport engine 70 may be programmed to send a given message from the send queue 64 if the Qkey in the message is valid relative to the Qkey data 92. In contrast, if the Qkey data in the message is not valid relative to the Qkey data 92, the message may be dropped and removed from the send queue 64.

In accordance with one particular aspect of the present invention, the Qkey data 92 may be utilized in conjunction with the attribute 90 to provide a selectable security feature for messages being sent from the send queue 64. That is, the transport engine 70 may be programmed and configured to control sending a message from the send queue 64 as a function of the attribute condition, the value of the Qkey data 92, and control information (e.g., the Qkey) in the message stored in the send queue 64.

By way of example, if the attribute 90 has a first condition, the transport engine 70 may be operative to send a given message from the send queue 64 provided that the message includes a Qkey having a value within a range of one or more values defined by the Qkey data 92. If the message has a Qkey that is not within the range defined by the Qkey data 92, the message is not allowed to be sent.

By way of further illustration, if the attribute 90 has a second condition, the transport engine 70 is operable to send a message from the send queue 64 provided that the message includes a Qkey that is outside the range of key values (or different from the key values) specified by the Qkey data 92. If a message has a Qkey that is within the range of key values defined by the Qkey data 92, the message is not allowed to be sent.

Thus, in accordance with an aspect of the present invention, the transport engine 70 provides an effective means to control sending an outgoing message from a respective queue pair 60 (or other suitable storage means) based on the Qkey data 92 and the attribute 90. Those skilled in the art will understand and appreciate other means that could be employed to control sending of messages in accordance with the present invention. For example, such control means could be implemented as hardware and/or software associated with the channel adapter 62, such as a processor or smart storage device, programmed and/or configured to perform the functionality shown and described herein.

As briefly mentioned above, the queue pair 60 further may be associated with one or more remote queue pairs 96, such as to enable interprocess communication through the associated queue pairs. The queue pair 96, which in this example is part of another channel adapter 98, is associated with an application or process (PROCESS B) 100 running within memory of a computer, schematically indicated at 102. While the remote process 100 is shown and described as running in a different node from the process 52, it is to be appreciated that interprocess communication can occur between processes at the same or different nodes. An operating system 104 also is associated with the computer 102.

The process 100 is operative to communicate a message, such as an IO request or other type of message, with the queue pair 96. In particular, the queue pair 96 includes a pair of queues, illustrated as a send queue 106 and a receive queue 108. Each queue pair 96 has a queue pair value (e.g., a number indicated as "Y"), which uniquely characterizes each queue pair within the channel adapter 98.

The queue pair 96 is operatively coupled to a transport engine 110. The transport engine 110 is programmed and/or configured to control the flow of data between the queue pair 96 and one or more ports 112 of the channel adapter 98, such as described above with respect to the transport engine 70. The ports 112 are coupled to the communications fabric 74 for communicating data with devices and/or processes associated with other nodes in the system 50.

By way of example, the transport engine 110 is operative to provide messages to the receive queue 108 provided that such messages are appropriately addressed to the queue pair 108 and have a valid Qkey value. The queue pair 108 is provided a Qkey. Thus, in order to establish datagram service between processes 52 and 100, the Qkey for the queue pair 96 is provided to the node associated with the process 52 and the Qkey for the queue pair 60 is provided to the node associated with the process 100 (e.g. an exchange of Qkeys for the associated queue pairs 60 and 96). The exchange of queue keys, for example, occurs at creation of the queue pairs via a privileged operation. The remote queue pair 96 utilizes its Qkey to validate incoming data packets. For example, if the transport engine 110 determines that a message sent to the remote receive queue 108 includes a Qkey having a value that is different from the one provided by the queue pair 96, the message may be rejected as invalid.

The transport engine 110 also is operable to control sending of a message from the send queue 106, such as described above. Briefly stated, an attribute 114 may be associated with the queue pair 96 in accordance with an aspect of the present invention. The attribute 114 has a condition (or value) that is set in a privileged operation not accessible by the process 100, such as by the operating system 104 when the queue pair 96 is created. The transport engine 110 may, in turn, control sending each message from the send queue 106 of the queue pair 96 based on selected data contained in the message (e.g., the Qkey data 86) and the attribute 114.

Other control information, such as Qkey data 116, may be associated with the queue pair 96 to improve the security associated with sending a message. The Qkey data 116 may identify one or more Qkey values (e.g., a range of Qkey values, which are set in a privileged operation not accessible by a user-level process, such as process 100. The transport engine 110 thus may control sending each message from the send queue 106 to a desired destination based on the Qkey data 116 and the Qkey contained in a message that has been provided directly to the send queue 106 by the process 100. Additionally, the transport engine 70 may be programmed and configured to control sending a message from the send queue 64 based on the attribute, the value of the Qkey data 92, and the Qkey of the message.

Figure 4:
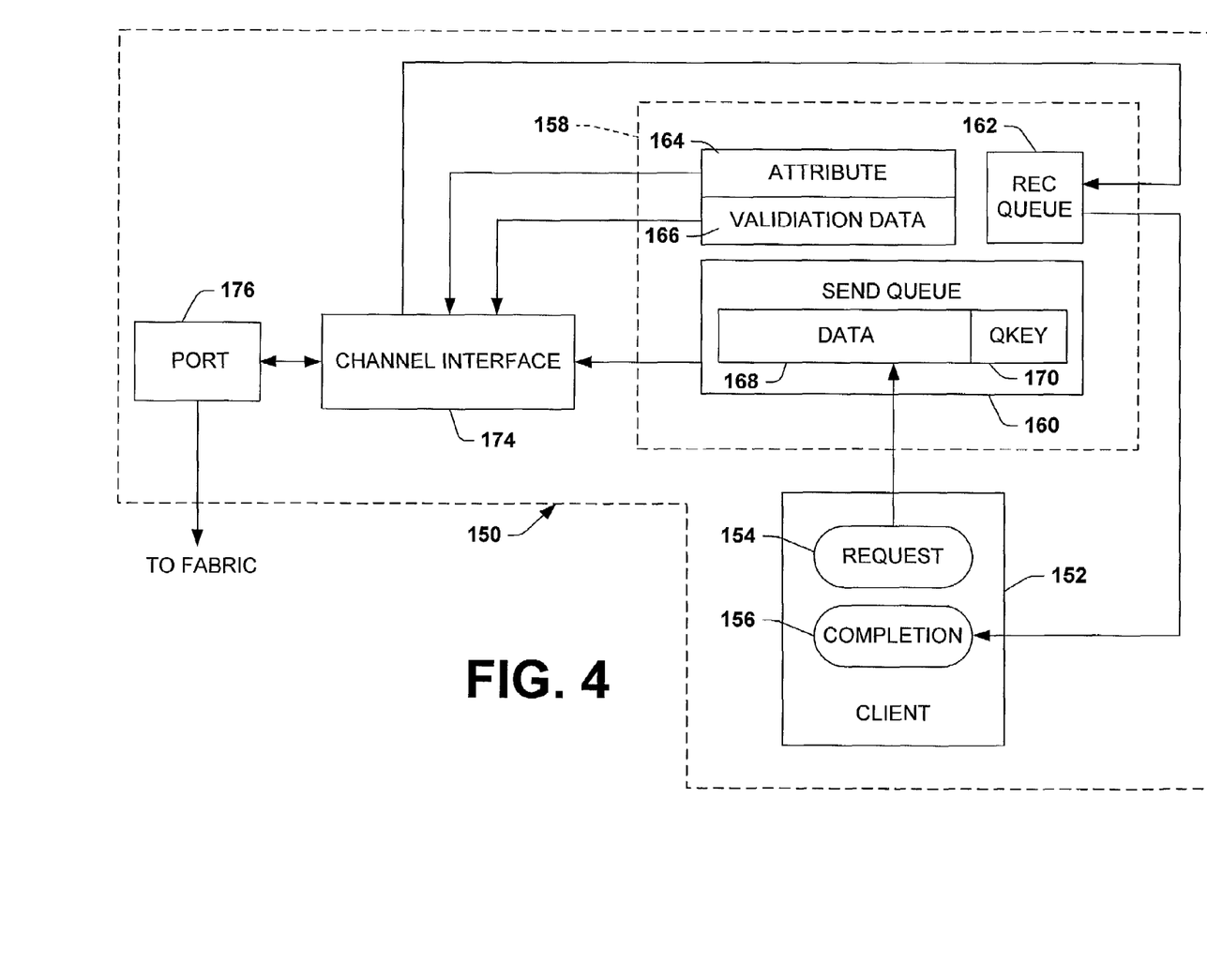
FIG. 4 is another example of a system operative to facilitate substantially secure communication in accordance with the present invention.

FIG. 4 illustrates an example of a node 150 that may be programmed and/or configured to operate in accordance with an aspect of the present invention. One or more client application or processes 152 may run in the node 150. The client 152 may issue a request 154 to another process or IO device and, in response to each request, receive a corresponding completion 156.

The client 152 communicates through a hardware abstraction schematically indicated at 158. The hardware abstraction 158 includes a storage device, which may be represented as first and second storage devices (e.g., queues) 160 and 162. The storage devices 160 and 162, which may be implemented within one or more physical storage devices, temporarily store data as it is respectively communicated relative to the client 152. The storage devices 160 and 162 are mapped into the client's virtual memory, such as by an operating system in a privileged mode. As a result, the client 152 is able to communicate requests 154 and completions 156 directly with the storage devices 160 and 162 that, in turn, communicate such information with other processes or IO devices.

In accordance with an aspect of the present invention, the hardware abstraction 158 also includes a control attribute 164 operative to have one of at least two conditions. The abstraction 158 further may include key data 166 having one or more key values, such as a range of key values. The attribute 164 and the key data 166 are set via a privileged operation and are not accessible by (or available to) the client 152.

Each request 154 issued by the client 152 is stored as message data 168 in the storage device 160. The entry 168 includes a message key 170, which is operable to enforce access rights to communication services. The node 150 also includes a channel interface 174 operatively coupled to the storage devices 160 and 162. In particular, the channel interface 174 is operative to read data from the storage device 160, such as a message or request from the client 152, and to write data to the storage device 162, such as from another client (e.g., an IO device or a process). The channel interface is coupled to one or more ports 176 for communicating data over a communications fabric, such as may include a network of links, routers, and switches.

In accordance with an aspect of the present invention, the channel interface 174 may utilize one or both of the attribute 164 and the key data 166 to control sending a message from the storage device 160. That is, the channel interface 174 may be programmed and/or configured to evaluate the message key 170 of each message 168 in the storage device 160 and validate the message based on the attribute 164 and/or the key data 166. The attribute 164 is set to a condition that defines a valid range of key values based on the key data 166 to control sending messages 168 from the storage device 160.

By way of illustration, if the attribute 164 has a first condition, the channel interface 174 may provide a given message from the send queue 160 to the port 176 (or another hardware abstraction associated with the node) provided that the message 168 has a Qkey 170 having a value that agrees with the valid range of key values. If the message 168 has a Qkey 170 that does not agree with the Qkey data 166, the message is not allowed to be sent.

By way of further illustration, if the attribute 164 has a second condition, which is different from the first condition, the channel interface 174 is operable to send a message from the storage device 160 provided that the message 168 that has a Qkey 170 that does not agree (e.g., outside the valid range of values provided by the Qkey data 166). If a message 168 has a Qkey 170 that is within the valid range of key values defined by the Qkey data 92, the message is not permitted to be sent from the storage device 160.

Those skilled in the art will understand and appreciate various control algorithms or methodologies that may be implemented to control sending such a message, all of which are contemplated as being within the scope of the present invention.

Figure 5:
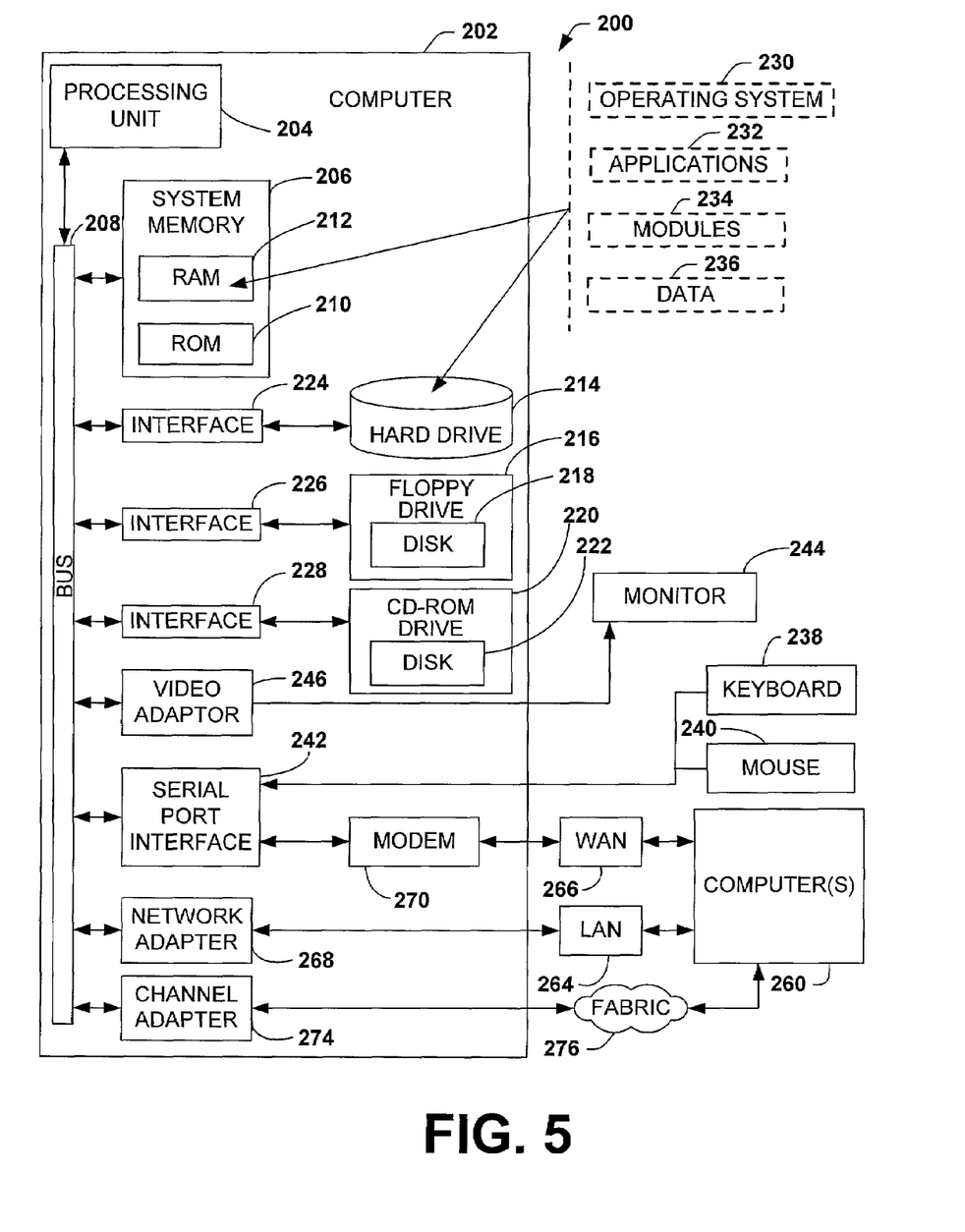
FIG. 5 is an example of an operating environment for a system implemented in accordance with the present invention.

In order to provide additional context for the various aspects of the present invention, FIG. 5 and the following discussion are intended to provide a brief, general description of a suitable computing environment 200 in which the various aspects of the present invention may be implemented. Additional context may be provided with reference to the above-incorporated InfiniBand™ Architecture Specification.

While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules or processes may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component.

With reference to FIG. 5, an exemplary system environment 200 for implementing the various aspects of the invention includes a conventional computer 202, including a processing unit 204, a system memory 206, and a system bus 208 that couples various system components including the system memory to the processing unit 204. The processing unit 204 may be any of various commercially available processors, including but not limited to Intel x86, PENTIUM and compatible microprocessors from Intel and others, including Cyrix, AMD and Nexgen; ALPHA microprocessors from Digital; MIPS microprocessors from MIPS Technology, NEC, IDT, Siemens, and others; and the POWERPC microprocessors from IBM and Motorola. Dual microprocessors and other multi-processor architectures also may be used as the processing unit 204.

The system bus 208 may be any of several types of bus structure including a memory bus or memory controller, a peripheral bus, and a local bus using any of a variety of conventional bus architectures such as PCI, VESA, Microchannel, ISA, and EISA, to name a few. The system memory includes read only memory (ROM) 210 and random access memory (RAM) 212. A basic input/output system (BIOS), containing the basic routines that help to transfer information between elements within the computer 202, such as during start-up, is stored in ROM 210.

The computer 202 also may include, for example, a hard disk drive 214, a magnetic disk drive 216, e.g., to read from or write to a removable disk 218, and an optical disk drive 220, e.g., for reading from or writing to a CD-ROM disk 222 or other optical media. The hard disk drive 214, magnetic disk drive 216, and optical disk drive 220 are connected to the system bus 208 by a hard disk drive interface 224, a magnetic disk drive interface 226, and an optical drive interface 228, respectively. The drives and their associated computer-readable media provide nonvolatile storage of data, data structures, computer-executable instructions, etc. for the computer 202. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 200, and further that any such media may contain computer-executable instructions for performing the methods of the present invention.

A number of program modules may be stored in the drives and RAM 212, including an operating system 230, one or more application programs 232, other program modules 234, and program data 236. The operating system 230 in the illustrated computer is, for example, one of the MICROSOFT WINDOWS® operating systems, which are available from Microsoft Corporation. It is to be appreciated, however, that the present invention may be implemented with other operating systems or combinations of operating systems.

A user may enter commands and information into the computer 202 through one or more user input devices, such as a keyboard 238 and a pointing device (e.g., a mouse 240). Other input devices (not shown) may include a microphone, a joystick, a game pad, a satellite dish, a scanner, or the like. These and other input devices are often connected to the processing unit 204 through a serial port interface 242 that is coupled to the system bus 208, but may be connected by other interfaces, such as a parallel port, a game port or a universal serial bus (USB). A monitor 244 or other type of display device is also connected to the system bus 208 via an interface, such as a video adapter 246. In addition to the monitor 244, the computer 202 may include other peripheral output devices (not shown), such as speakers, printers, etc.

The computer 202 may operate in a networked environment using logical connections to one or more remote computers 260. The remote computer 260 may be a workstation, a server computer, a router, a peer device or other common network node, and typically includes many or all of the elements described relative to the computer 202, although, for purposes of brevity, only a memory storage device 262 is illustrated in FIG. 5. The logical connections depicted in FIG. 5 may include a local area network (LAN) 264 and a wide area network (WAN) 266. Such networking environments are commonplace in offices, enterprise-wide computer networks, intranets and the Internet.

When used in a LAN networking environment, the computer 202 is connected to the local network 264 through a network interface or adapter 268. When used in a WAN networking environment, the computer 202 typically includes a modem 270, or is connected to a communications server on the LAN, or has other means for establishing communications over the WAN 266, such as the Internet. The modem 270, which may be internal or external, is connected to the system bus 208 via the serial port interface 242. In a networked environment, program modules depicted relative to the computer 202, or portions thereof, may be stored in the remote memory storage device 262. It will be appreciated that the network connections shown are exemplary and other means of establishing a communications link between the computers 202 and 260 may be used.

By way of further illustration, the computer 202 may include a channel adapter 274 that interfaces the computer and its associated IO devices and applications running in memory with a communications fabric 276. The communications fabric 276, for example, may include a collection of links, switches and routers that interconnect a plurality of channel adapters. The remote computer 260 thus may communicate with the computer 202 via the communications fabric 276. Various other IO modules and/or computers (not shown) further may communicate with the computer 202 via the fabric, such as in accordance with the substantially secure communication services scheme described herein.

In accordance with the practices of persons skilled in the art of computer programming, the present invention has been described with reference to acts and symbolic representations of operations that are performed by a computer, such as the computer 202 or remote computer 260, unless otherwise indicated. Such acts and operations are sometimes referred to as being computer-executed. It will be appreciated that the acts and symbolically represented operations include the manipulation by the processing unit 204 of electrical signals representing data bits which causes a resulting transformation or reduction of the electrical signal representation, and the maintenance of data bits at memory locations in the memory system (including the system memory 206, hard drive 214, floppy disks 218, CD-ROM 222, and shared storage system 210) to thereby reconfigure or otherwise alter the computer system's operation, as well as other processing of signals. The memory locations where such data bits are maintained are physical locations that have particular electrical, magnetic, or optical properties corresponding to the data bits.

Figure 6:
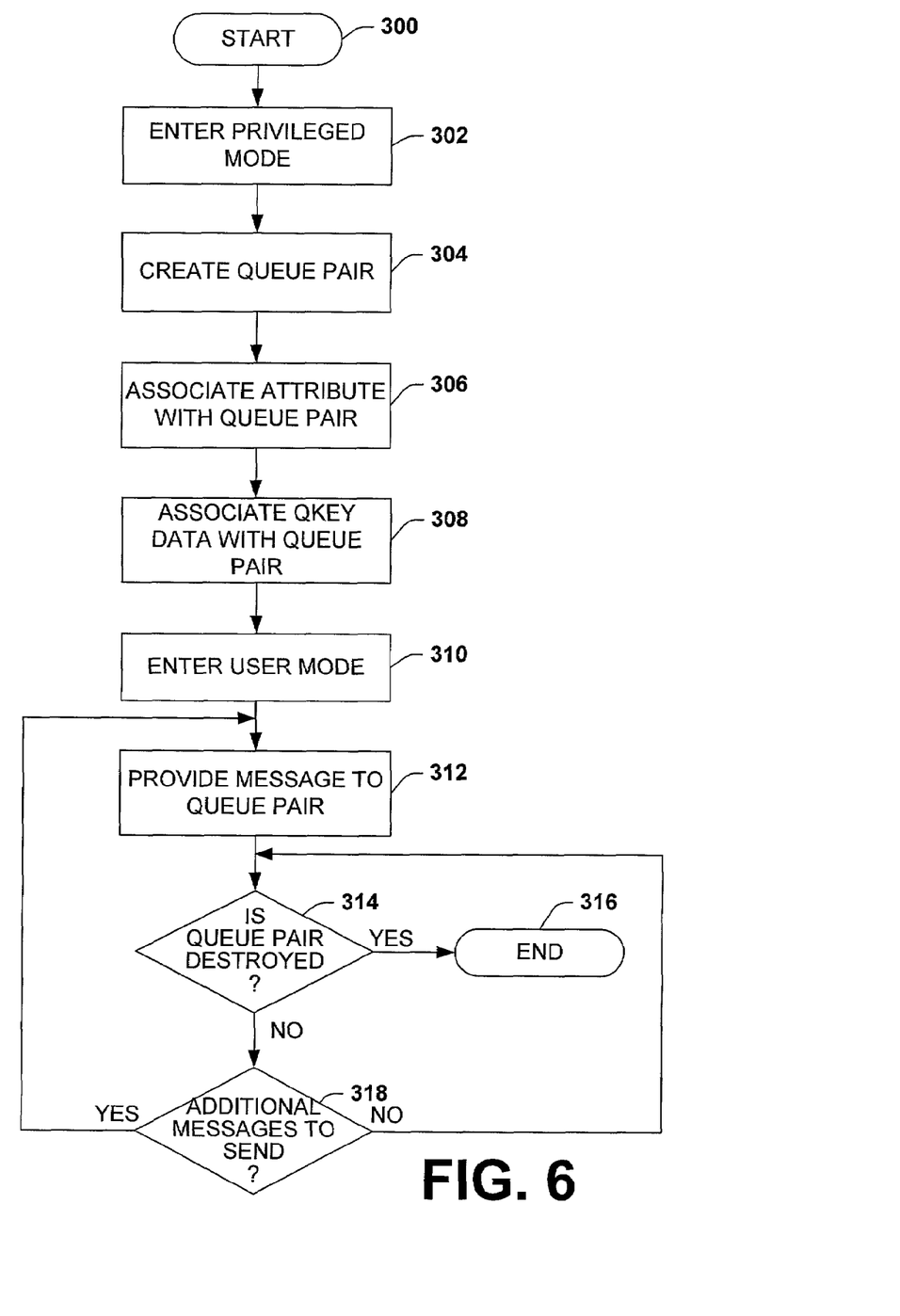
FIG. 6 is a flow diagram illustrating a methodology to facilitate substantially secure communication in accordance with the present invention.
Figure 7:
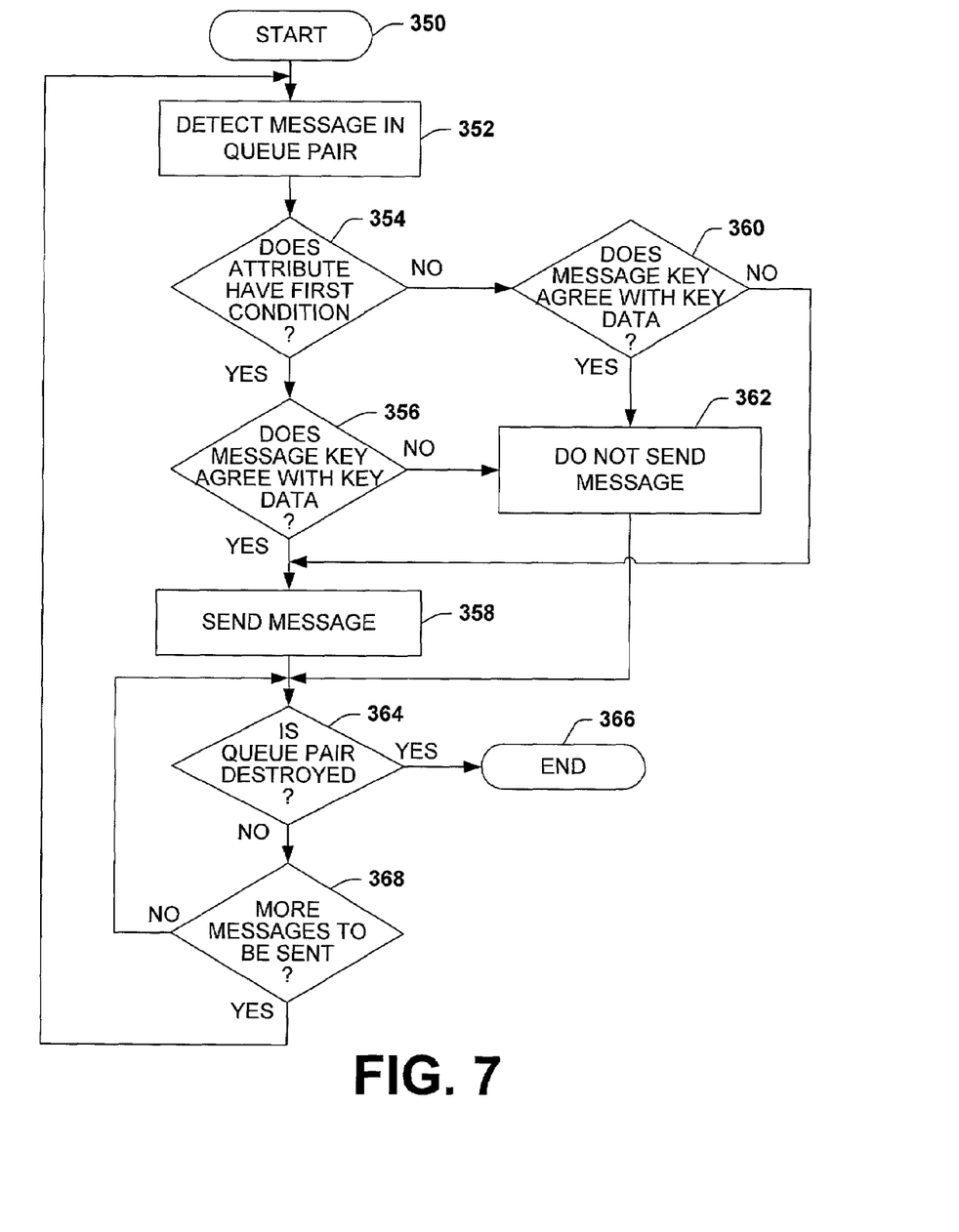
FIG. 7 is a flow diagram illustrating another methodology to facilitate substantially secure communication in accordance with the present invention.

In view of the foregoing structural, functional, and graphical features described above, methodologies in accordance with various aspects of the present invention will be better appreciated with reference to FIGS. 6 and 7. While, for purposes of simplicity of explanation, the methodologies of FIGS. 6 and 7 are shown and described as a series of steps, it is to be understood and appreciated that the present invention is not limited by the order of steps, as some steps may, in accordance with the present invention, occur in different orders and/or concurrently with other steps from that shown and described herein. Moreover, not all illustrated steps may be required to implement a methodology in accordance with an aspect the present invention.

FIG. 6 illustrates a methodology that facilitates substantially secure communication of messages in accordance with an aspect of the present invention. The methodology may be implemented in a system architecture that permits user-level applications or processes to communicate directly with hardware, such as by mapping the hardware into virtual memory space associated with the process. The methodology begins at step 300 in which a user-level application or process is initiated. Next, at step 302, a privileged mode is entered, such as kernel mode, in which the operating system is operable to perform privileged operations. The methodology proceeds to step 304 in which a queue pair is created. The queue pair is a hardware abstraction with which a user-level application or process may directly communicate. The queue pair includes one or more storage devices (e.g., queues) for temporarily storing data to be sent or data that has been received from another associated queue pair.

From step 304, the process proceeds to step 306 in which an attribute is associated with the queue pair created at step 304. The attribute has a condition that is set in a privileged operation, such as by an operating system. For example, the attribute may have one of two or more conditions (or values), such as corresponding to a single bit or a multi-bit field. Next, at step 308, Qkey data is associated with the queue pair, such as by the operating system. The Qkey data identifies one or more Qkey values (e.g., a range of Qkey values). The methodology then proceeds to step 310.

At step 310, a user mode associated with the user-level application or process is entered. Next, at step 312, the application or process may provide a message to the queue pair. The message, for example, is an IO request or other type of message for a destination process or IO module. From step 312, the methodology proceeds to step 314.

At step 314, a determination is made as to whether the queue pair has been destroyed. If the queue pair has been destroyed, the methodology proceeds to step 316 in which the process ends. If the queue pair still exists, the methodology continues to step 318. At step 318, a determination is made as to whether the user-level process has any additional messages to send. If additional messages are to be sent, the methodology returns to step 312, in which such messages may be provided to the queue pair for being sent to a desired destination. The messages are stored in the queue pair provided that the queue pair has sufficient room for the message. If the determination at step 318 is negative, indicating that no additional messages are to be sent, the process returns to step 314.

FIG. 7 illustrates another methodology, in accordance with an aspect of the present invention, which may facilitate substantially secure communication of data that has been provided from a user-level process directly to hardware, such as a queue pair. The methodology of FIG. 7 may occur concurrently with that of FIG. 6, such as while the corresponding queue pair exists. The methodology begins at step 350, such as in response to creation of the queue pair and process associated with such queue pair. Next, at step 352, a message, such as is addressed to another queue pair, is detected in the queue pair. From step 352 the methodology proceeds to step 354.

At step 354, a determination is made as to whether an attribute associated with the queue pair has a first condition. As mentioned above, the attribute may have one of at least two different conditions, such as may be set to a desired condition (or value) in a privileged operation not accessible by a user-level process. If the determination is affirmative, the methodology proceeds to step 356. At step 356, a determination is made as to whether the message detected at step 352 has a Qkey that agrees with key data that has been assigned to the queue pair. If this determination is affirmative, indicating that the message key is valid, the methodology proceeds to step 358. At step 358, the message is sent from the queue pair.

If the determination back at step 354 is negative, thereby indicating that the attribute has an attribute that is different from the first condition, the methodology proceeds to step 360. At step 360, a determination is made as to whether the message detected at step 352 has a Qkey that agrees with key data that has been assigned to the queue pair (e.g., the Qkey in the message is validated). If the Qkey is validated at step 360 or if the determination at step 356 is negative, the methodology proceeds to step 362. At step 362, the message is prevented from being sent from the queue pair to its intended destination, thereby helping ensure security in messages being communicated from the queue pair.

While the example of FIG. 7 illustrates two possible attribute conditions, those skilled in the art will understand and appreciate that more than two attribute conditions could be implemented in a methodology in accordance with an aspect of the present invention. It is also to be appreciated that the resolution of attribute condition at step 354 alternatively could be characterized as determining a range of valid key values for the queue pair. Moreover, steps 356 and 360 could be characterized as validating messages to be sent from the queue pair (e.g., a send queue), with each step (step 356 and 360) employing a different range of valid key values.

If the determination at step 360 is negative, such as in response to the attribute having a condition different from the first condition and the Qkey of the message not agreeing with the key data, the process proceeds to step 358 to send the message. From step 358, the methodology proceeds to step 364, in which a determination is made as to whether the queue pair has been destroyed. If the queue pair has been destroyed, the methodology ends at step 366, as destruction of the queue pair removes the messages therefrom. If the determination at step 364 is negative, the methodology proceeds to step 368, in which a determination is made as to whether the queue pair has other messages to be sent. If this determination is negative the methodology loops back to step 364. If additional messages are in the queue pair for sending to a desired destination(s), the methodology returns to step 352 in which the foregoing steps are repeated for the next message intended to be sent from the queue pair.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system to facilitate secure communication, comprising:
    a communication component operative to store an outgoing message received directly from an associated process, the outgoing message including a message key having a key value, an attribute being associated with the communication component, the attribute having selectable attribute conditions that are inaccessible by the associated process; and
    a filter associated with the communication component, the filter controlling sending the stored outgoing message from the communication component based on the key value of the outgoing message and one of the attribute conditions.

2. The system of claim 1, wherein the communication component further comprises at least one storage device operative to store messages.

3. The system of claim 2, wherein the at least one storage device further comprises at least one queue operative to store messages being sent by the associated process.

4. The system of claim 3, wherein the at least one queue further comprises at least two queues, one of the at least two queues being operative to store messages being sent by the associated process and another of the at least two queues being operative to store messages being sent to the associated process.

5. The system of claim 1, wherein the message key corresponds to a key associated with another communication component that is associated with a desired destination.

6. The system of claim 1, wherein the message key is a multi-bit field for storing data identifying a key associated with a destination communication component.

7. The system of claim 1, wherein the filter is operative to prevent sending the outgoing message from the communication component upon detecting an invalid message key in the outgoing message.

8. The system of claim 7, wherein key data having a range of at least one key value is associated with the communication component, the key data being inaccessible by the associated process, the filter controlling transmission of the outgoing message based on the validation of the message key as a function of one of the attribute conditions and the range of at least one key value.

9. The system of claim 8, wherein the filter employs the attribute to define a valid range of at least one key value based on the at least one key value associated with the communication component, such that the filter provides different control in connection with a message having a message key within the valid range and a message having a message key outside the valid range.

10. The system of claim 9, wherein the key data identifies a plurality of key values.

11. The system of claim 10, wherein the filter is operative to permit whether a message having a message key in the valid range is sent from the communication component.

12. A system to facilitate secure communication between at least two processes, comprising:
   a first queue operative to store a request received directly from a first of the at least two processes and, upon validation of the stored request, to send the stored request to a second of the at least two processes, the stored request including a destination address and a key having a key value; and
   an interface operative to validate the stored request based on the key value of the stored request relative to at least one predetermined key value associated with the first queue, the at least one key value associated with the first queue being unavailable to the first process.

13. The system of claim 12, further comprising an attribute associated with the first queue, the attribute defining a valid range of key values based on the at least one key value associated with the first queue to control sending stored requests from the first queue.

14. The system of claim 13, wherein the attribute has selectable attribute conditions that are unavailable to the first process and the valid range of message keys varies as a function of the attribute conditions and the at least one key value associated with the first queue.

15. The system of claim 14, wherein the at least one key value associated with the first queue further comprises a plurality of key values associated with the first queue and unavailable to the first process.

16. The system of claim 14, wherein the attribute is set to have one of at least a first condition and a second condition.

17. The system of claim 16, wherein the interface is operative to prevent the stored request from being sent from the first queue if the attribute has the first condition and the key has a value that agrees with the at least one key value associated with the first queue.

18. The system of claim 17, wherein the interface is operative to permit the stored request from being sent from the first queue if the attribute has the first condition and the key has a value that disagrees with the at least one key value associated with the first queue.

19. The system of claim 16, wherein the interface is operative to prevent the stored request from being sent from the first queue if the attribute has the second condition and the key has a value that agrees with the at least one key value associated with the first queue.

20. The system of claim 12, wherein the interface is operative to prevent sending the request from the first queue if the request includes an invalid key.

21. A system to facilitate secure communication between at least two user-level processes, comprising:
   storage means for storing an outgoing message received from a first of the at least two processes, the outgoing message including a message key associated with a destination, an attribute being associated with the storage means, the attribute having selectable attribute conditions unavailable to user-level processes; and
   control means for controlling sending of the stored outgoing message from the storage means based on the message key and one of the attribute conditions.

22. The system of claim 21, further comprising validation data associated with the storage means and unavailable to user-level processes, the control means controlling sending of the outgoing message based on the validation of the message key as a function of the attribute and validation data.

23. The system of claim 22, wherein the validation data comprises at least one key value.

24. The system of claim 23, wherein control means is operative to control whether the stored message can be sent from the storage means based on the message key relative to a valid range of key values, which varies as a function of one of the attribute conditions and the validation data.

25. A system to facilitate secure communication between at least two user-level processes, comprising:
   storage means for storing a request received directly from a first of the at least two processes and, upon validation of the stored request, for sending the stored request to a second of the at least two processes, the stored request including a key having a key value; and
   validation means for validating the stored request based on the key value of the stored request relative to at least one predetermined key value associated with the storage means, the at least one key value associated with the storage means being unavailable to user-level processes.

26. The system of claim 25, further comprising an attribute associated with the storage means, the attribute defining a valid range of key values based on the at least one key value associated with the storage means, the validation means controlling sending stored requests from the storage means according to the valid range of key values.

27. The system of claim 26, wherein the attribute has selectable attribute conditions that are not available to user-level processes, the valid range of key values varying as a function of the attribute conditions and the at least one key value associated with the storage means.

28. A computer-readable medium having computer-executable instructions for:
   storing in a storage device an outgoing message received directly from an associated user-level process, the outgoing message including a message key having a key value, an attribute being associated with the storage device, the attribute having selectable attribute conditions unavailable to user-level processes; and
   controlling sending the stored outgoing message from the communication component based on the key value of the outgoing message and one of the attribute conditions.

29. A computer-readable medium having computer-executable instructions for:
   storing a request received directly from a first of at least two user-level processes in a storage device;
   upon validation of the stored request, sending the stored request to a second of the at least two processes, the stored request including a key having a key value; and
   validating the stored request based on the key value of the stored request relative to at least one predetermined key value associated with the storage device, the at least one key value associated with the storage device being unavailable to user-level processes.

30. A method to facilitate secure communication from a first user-level process in a system in which the first process is operable to communicate directly with hardware, comprising:
   storing an outgoing message received directly from the first process in an associated storage device, the outgoing message including a message key having a key value; and
   controlling sending of the stored message to a second process based on the value of the message key relative to a predetermined at least one key value associated with the storage device, the at least one key value associated with the storage device being unavailable to the first process.

31. The method of claim 30, further comprising associating an attribute with the storage device that is operable to define a valid range of key values based on the at least one key value associated with the storage device, and controlling sending of the stored message from the storage device based on the message key thereof and the defined valid range of key values.

32. The method of claim 31, wherein the attribute has selectable attribute conditions not available to the first process, the valid range of key values varying as a function of the attribute conditions and the at least one key value associated with the storage device.

33. The method of claim 30, further comprising validating the message key relative to the at least one key value associated with the storage device, and, upon detecting an invalid message key, preventing the stored message from being sent from the storage device.

34. A method to facilitate secure communication from a first user-level process in a system in which the first process is operable to communicate directly with hardware, comprising:

storing an outgoing message received directly from the first process in a storage device associated with the first process, the outgoing message including a message key associated with a destination, an attribute being associated with the storage device, the attribute having selectable attribute conditions being inaccessible by user-level processes; and controlling sending of the stored outgoing message from the storage device based on the message key of the stored outgoing message and one of the attribute conditions of the storage device.

* * * * *